June 29, 1937. J. LITHGOW 2,085,107
LIQUID CARBONATOR
Filed Sept. 27, 1933
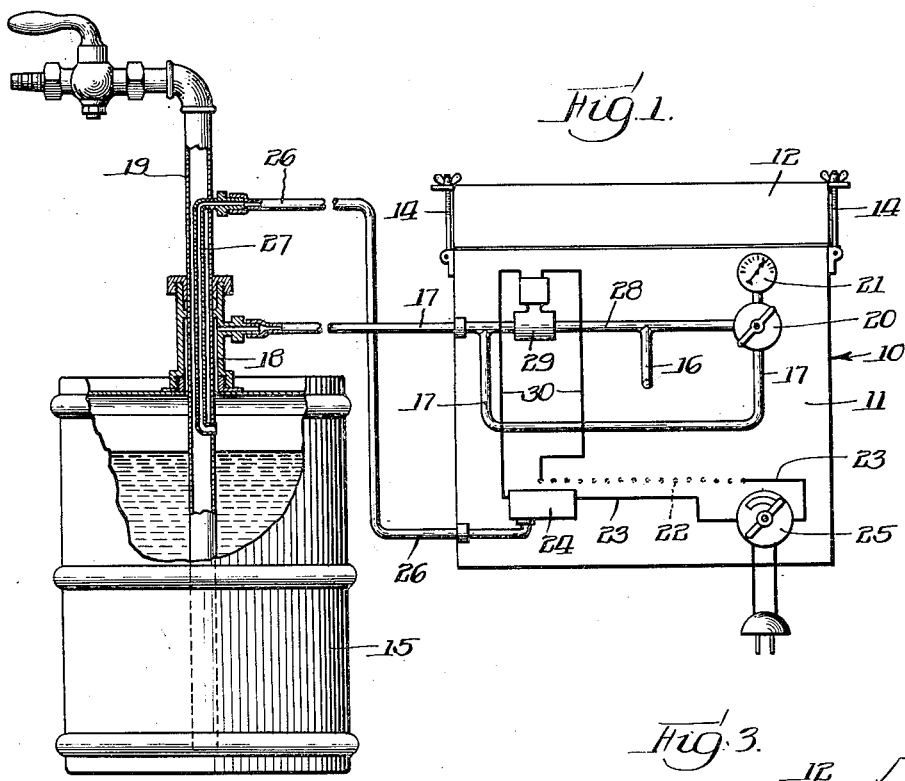
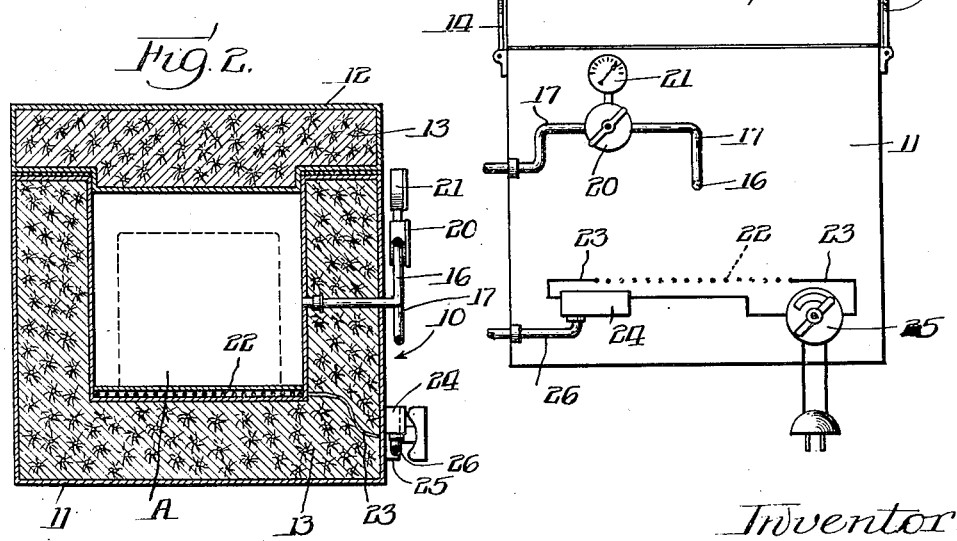
Inventor:
John Lithgow
By Chindahl, Parker + Carlson
attys.

Patented June 29, 1937

2,085,107

UNITED STATES PATENT OFFICE 2,085,107

LIQUID CARBONATOR

John Lithgow, Blue Island, Ill.

Application September 27, 1933, Serial No. 691,193

15 Claims. (Cl. 62—91.5)

The invention relates to liquid carbonators and more particularly to devices of this nature especially intended for carbonating beverages.

An object of the invention is to provide a new and improved carbonating device using solid carbon dioxide or "dry-ice" as the source of the carbonating medium.

Another object is to provide such a device which utilizes substantially the entire carbonating effect of the dry-ice without waste whereby maximum efficiency is attained.

A further object resides in the provision of means for controlling the rate of sublimation of the dry-ice by substantially preventing such action during idle periods and increasing said rate as additional carbonating medium is required.

Another object is to provide means responsive to the pressure on the liquid being carbonated for controlling the rate of sublimation of the dry-ice.

More specifically stated, an object of the invention is to provide a carbonating device for liquids, and particularly beverages, which embodies a sealed and insulated container for dry-ice which is connected to discharge the carbon dioxide gas derived by sublimation into the liquid or beverage container, the discharge being controlled by valve means arranged to maintain a desired pressure in the liquid container, said dry-ice container having heating means associated therewith and controlled by pressure within the system for increasing the rate of sublimation of the dry-ice.

In conjunction with the foregoing, another object resides in the provision of means for rapidly increasing the pressure in the liquid container when necessary.

Other objects and advantages will become apparent in the following description and from the accompanying drawing, in which:

Figure 1 is a somewhat diagrammatic view of a device embodying the features of the invention, said view being partially in section.

Fig. 2 is a vertical section through the dry-ice container.

Fig. 3 is a simplified modification of a part of the device as shown in Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In a preferred form of device which has been shown merely in illustration of the invention, an insulated container 10 is provided to receive a suitable carbonating substance, such as solid carbon dioxide commonly known as dry-ice. Herein, the container comprises a box-like structure (Fig. 2) having a base 11 constituting a receptacle for a block A of dry-ice, and a cover element 12, both the base and cover being provided with a heavy layer of insulation 13 to avoid heat transfer through the walls. The cover may be secured on the base in sealed relation thereto by suitable fastening devices 14.

Any desired type of container 15 for the liquid or beverage to be carbonated may be employed, such as the illustrated barrel, so long as the container is substantially sealed. A duct 16 leads from the interior to the exterior of the container 10 where it connects with a conduit 17 which, in turn, leads to and is connected with a suitable fitting 18 on the liquid container 15.

Carbonating gas or carbon dioxide gas produced by the sublimation of the solid carbon dioxide is delivered through these connections from the container 10 to the liquid container 15. For drawing liquid from the container 15, a valve controlled delivery pipe 19 or the like may be employed, which pipe may extend from approximately the bottom of the container, through the fitting 18 to a suitable delivery point. Clearance between the pipe 19 and the fitting allows the gas to flow freely from conduit 17 into the liquid container.

Inasmuch as the pressure of the gas produced by the sublimation of dry-ice in a closed container is greater than the pressure under which liquids are normally carbonated, an adjustable pressure reducing valve 20, preferably embodying a pressure indicator 21, is interposed in the conduit 17. By proper regulation of this valve, any desired carbonating pressure may be maintained in the liquid container.

When the present device is used infrequently the dry-ice will sublime slowly because of the heavy insulation and such action will be retarded by the created pressure of the gas in the container 10. Ample gas under pressure will, therefore, always be available as a source of supply for the liquid container. Should liquid be withdrawn frequently and rapidly, however, the gas requirement becomes correspondingly greater. Means has, therefore, been provided for increasing the rate of sublimation of the dry-ice whereby the available supply of gas will meet all requirements. To this end, heating means is provided in association with the dry-ice container and the control of this means may be and preferably is automatically responsive to the pressure of carbonating gas in the system.

In the dry-ice container 10 is an electric heating element 22 having leads 23 which are connected, through a pressure actuated switch 24 and a manually operable off and on switch 25, with a suitable source of current. The pressure switch 24 is of conventional construction and is, in this instance, connected through conduit 26 with the interior of the liquid container 15. If desired, the conduit 26 may enter the container 15 through the discharge pipe 19, as shown in Fig. 1, by extending the end section 27 thereof into the pipe 19 exteriorly of the container and providing communication thereof with the interior of the container through the wall of the pipe.

The pressure switch 24 is normally open and is arranged to make the circuit when the pressure in the liquid container falls below a predetermined minimum. When the switch closes, the heating element 22 is energized and the rate of sublimation of the dry-ice is increased to produce carbon dioxide gas rapidly. As soon as the pressure in the liquid container passes the required maximum, the pressure switch opens and the operation of the heating element is discontinued.

The use of means for increasing the rate of sublimation is additionally advantageous for the following reason. The volume of gas derived by sublimation depends, among other things, upon the exposed surface area of the subliming substance. Hence, as the block A of solid carbon dioxide decreases in size during use, its surface area and the resultant rate of sublimation also decrease. Therefore, without some means of maintaining the volume of gas derived by sublimation approximately constant, regardless of the size of the block of dry-ice, the available volume of carbonating gas would vary widely.

The above described structure is illustrated in Fig. 3 and is primarily intended for relatively small installations, as in the home or in small refreshment establishments. In such installations an adequate volume of gas can be delivered with ample rapidity through the pressure reducing valve 20. However, in larger installations as in manufacturing plants a very rapid withdrawal of carbonated liquid might necessitate a volume and rate of gas supply greater than could flow through the pressure reducing valve. Hence, as shown in Fig. 1, a by-pass conduit 28 controlled by a normally closed valve 29 may be connected with the duct 16 and conduit 17 around the pressure reducing valve 20. Opening of this valve 29 permits of a rapid, full-pressure flow of gas directly from the carbon dioxide container to the liquid container. Preferably control of the by-pass valve 29 is automatically effected when the heating element is on, as in the manner illustrated, by employing a valve of the solenoid type, as the valve 29, and connecting this valve through leads 30 for control by the pressure switch 24.

In operation, a block of dry-ice is placed in the container 10 which is then sealed. Sublimation of the dry-ice produces carbon dioxide gas which is delivered through the pressure regulator to the liquid container at a proper carbonating pressure. As long as the pressure in the liquid container is properly maintained, the device operates in this fashion but should the pressure fall below a predetermined minimum, the pressure switch is closed and heat is applied to the dry-ice to increase the rate of sublimation. In the larger installations, the dry-ice and liquid containers are connected directly at the same time to replenish the gas in the liquid container rapidly.

It will be evident from the foregoing that a simple means of carbonating liquids has been provided which will operate with high efficiency. Practically the only care and attention necessary is in the replacement of dry-ice. It should be noted that the present device eliminates the use of unwieldly, high pressure cylinders of carbon dioxide gas.

I claim as my invention:

1. A carbonating device comprising, in combination, an insulated and sealed container for dry-ice, a container for a liquid to be carbonated, a conduit for carbon dioxide between said containers, a pressure reducing valve in said conduit, a pressure switch connected with the liquid container for control by the pressure therein to be closed when the pressure decreases below a predetermined minimum, a heating element in the dry-ice container connected with said pressure switch, a by-pass conduit around the pressure reducing valve, and a normally closed solenoid valve in said by-pass conduit connected with said pressure switch.

2. A carbonating device comprising, in combination, an insulated and sealed container for dry-ice, a container for a liquid to be carbonated, a conduit for carbon dioxide between said containers, a pressure reducing valve in said conduit, a pressure switch connected with the liquid container for control by the pressure therein to be closed when the pressure decreases below a predetermined minimum, and a heating element in the dry-ice container connected with said pressure switch.

3. A carbonating device comprising, in combination, an insulated and sealed container for dry-ice, a container for a liquid to be carbonated, a conduit for carbon dioxide between said containers, a pressure reducing valve in said conduit, a pressure switch connected with the liquid container for control by the pressure therein to be closed when the pressure decreases below a predetermined minimum, and a heating element in the dry-ice container.

4. A carbonating device comprising, in combination, an insulated and sealed container for dry-ice, a container for a liquid to be carbonated, a conduit for carbon dioxide between said containers, a pressure reducing valve in said conduit, heating means in the container for dry-ice, and pressure responsive means for controlling said heating means.

5. A carbonating device comprising, in combination, a container for solid carbon dioxide, a liquid container connected therewith, and means controlled by the pressure of carbon dioxide gas in said liquid container for varying the rate of sublimation of the solid carbon dioxide.

6. A carbonating device comprising, in combination, a container for solid carbon dioxide, a liquid container connected therewith, and means controlled by the pressure of carbon dioxide gas in said liquid container for varying the rate of sublimation of the solid carbon dioxide and the volume of gas flowing to the liquid container.

7. A carbonating device comprising, in combination, a carbonating pressure system including a container for solid carbon dioxide, a liquid container connected therewith, and means controlled by the pressure in the system for controlling sublimation of the solid carbon dioxide.

8. A carbonating device comprising, in combination, a carbonating pressure system including a container for solid carbon dioxide, a liquid container connected therewith, and means including an electric switch controlled by the pressure in the system for controlling the volume of gas flowing to the liquid container.

9. In a carbonating device of the character described, the combination of a container for a carbonating substance under pressure, and heating means arranged to supply heat directly into the interior of said container and automatically controlled by a reduction in the pressure of the substance below a predetermined minimum for increasing the pressure of said substance.

10. In a carbonator, the combination of a container for solid carbon dioxide, heating means arranged to supply heat with undiminished efficiency to progressively diminishing quantities of the solid carbon dioxide and means operating automatically by the gas pressure of sublimed carbon dioxide to operate said heating means and control the sublimation of said solid carbon dioxide.

11. A carbonating device comprising, in combination, a container for solid carbon dioxide, a liquid container connected therewith, means for controlling the flow of carbon dioxide gas to said liquid container, and means for increasing the rate of sublimation of the solid carbon dioxide including a heating element in the container in substantially contactual proximity to the solid carbon dioxide.

12. A carbonating device comprising, in combination, an insulated and sealed chamber for solid carbon dioxide, a container for a liquid to be carbonated, a conduit for delivering carbon dioxide gas from said chamber to said container, a pressure reducing valve in said conduit, means controlled by gas pressure in the system for controlling sublimation of the solid carbon dioxide, and a by-pass conduit having a normally closed valve connected with said means and adapted to be opened thereby to allow a free flow of gas through said by-pass conduit directly to said container when heavy demands for gas are made such as result from rapid withdrawal of liquid from said container.

13. In a carbonating system of the character described, the combination of a container for a carbonating substance under pressure, means for transferring heat to the carbonating substance, and means operable automatically as an incident to variations in pressure in the system below a predetermined minimum for controlling said first mentioned means to increase the amount of heat transferred to the carbonating substance and to increase the pressure of said substance.

14. A carbonating device comprising, in combination, a carbonating pressure system including a container for solid carbon dioxide, a liquid container connected therewith, and means including an electric switch operated by a reduction in the pressure in the system and an electric resistance heating device effective to accelerate sublimation of the solid carbon dioxide.

15. In a system for the utilization of gas under pressure, means for utilizing the gas, a container for a non-gaseous substance transformable into a gaseous state, electric heating means for increasing the rate of transformation of said substance into gas, and means operable by the pressure of said gas for operating said heating means automatically as an incident to variations in pressure of said gas below a predetermined minimum.

JOHN LITHGOW.